United States Patent
Jung et al.

(10) Patent No.: US 7,117,087 B2
(45) Date of Patent: Oct. 3, 2006

(54) METHOD FOR ESTIMATING LOCATION OF MOVING OBJECT IN NAVIGATION SYSTEM

(75) Inventors: Mun Ho Jung, Seoul-si (KR); Moon Jeung Joe, Anyang-si (KR); Yong Hyun Park, Yougin-si (KR); Seong Chan Byun, Seoul-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 10/681,106

(22) Filed: Oct. 9, 2003

(65) Prior Publication Data

US 2004/0073364 A1    Apr. 15, 2004

(30) Foreign Application Priority Data

Oct. 11, 2002  (KR) .................... 10-2002-0062113

(51) Int. Cl.
*G01C 21/26*    (2006.01)
(52) U.S. Cl. .............. 701/213; 701/207; 701/208; 701/300; 340/995.28; 342/357.01; 342/357.06
(58) Field of Classification Search ........... 701/200, 701/207–208, 213–217, 300; 340/988, 990, 340/995.14, 995.22, 995.25, 995.28; 342/357.01, 342/357.02, 357.03, 357.04, 357.06, 357.13, 342/357.14, 358
See application file for complete search history.

(56) References Cited

U.S. PATENT DOCUMENTS

| | | | | |
|---|---|---|---|---|
| 4,796,191 A | * | 1/1989 | Honey et al. ............... 701/217 |
| 5,311,195 A | * | 5/1994 | Mathis et al. ........... 342/357.14 |
| 5,337,243 A | * | 8/1994 | Shibata et al. ............... 701/214 |
| 5,416,712 A | * | 5/1995 | Geier et al. .................. 701/216 |
| 5,483,456 A | * | 1/1996 | Kuwahara et al. ........... 701/215 |
| 5,552,990 A | * | 9/1996 | Ihara et al. .................. 701/208 |
| 5,948,043 A | * | 9/1999 | Mathis ........................ 701/208 |
| 6,324,474 B1 | * | 11/2001 | Beisner et al. .............. 701/215 |
| 6,657,584 B1 | * | 12/2003 | Cavallaro et al. ....... 342/357.06 |
| 6,728,637 B1 | * | 4/2004 | Ford et al. ................... 701/213 |
| 2004/0210383 A1 | * | 10/2004 | Sato ........................... 701/207 |
| 2005/0065722 A1 | * | 3/2005 | Wood et al. ................. 701/213 |

FOREIGN PATENT DOCUMENTS

JP    2002213979 A  *  7/2002
KR       216535 B1     5/1999

* cited by examiner

*Primary Examiner*—Gertrude A. Jeanglaude
(74) *Attorney, Agent, or Firm*—Birch, Stewart, Kolasch & Birch, LLP

(57) ABSTRACT

The present invention relates to a method for estimating location of a moving object in a navigation system, which is capable of accurately estimating location of the object in a shadow area of GPS location data so that navigation service is provided. A method for estimating location of a moving object in a navigation system includes the steps of: (a) receiving GPS location data from a moving object; (b) determining GPS shadow area by using the received GPS location data; (c) calculating moving straight distance of the moving object with reference to a last GPS location data in visible regions when the moving object is in a GPS shadow area; (d) calculating virtual location data by using the calculated moving straight distance of the moving object; and (e) calculating estimated location on a digital numeric map positioned nearest from the virtual location data, and performing a map-matching to provide a navigation service.

12 Claims, 6 Drawing Sheets

METHOD FOR ESTIMATING LOCATION OF MOVING OBJECT IN NAVIGATION SYSTEM

This Nonprovisional application claims priority under 35 U.S.C. § 119(a) on Patent Application No(s). 2002-62113 filed in Korea on Oct. 11, 2002, the entire contents of which are hereby incorporated by reference.

BACKGROUND OF THE INVENTION

1. Field of the Invention

The present invention relates to a method for estimating location of a moving object in a navigation system, which is capable of accurately estimating a next location of the object by using a speed of the moving object and a direction of the link on a digital numeric map especially when a moving object (e.g. a vehicle) goes in a shadow area.

2. Description of the Related Art

Generally, in the navigation system, location information of the moving object is provided continuously in real time within a range of an allowable error and used for the services to display the present location of the moving object, to guide a moving path and to recognize an environment. However, the wrong location estimation or the discontinuous location estimation can affect a movement of the moving object seriously. Therefore, it is very important to estimate the location of the moving object.

The method for estimating the location of the moving object is disclosed in the Korean Patent No. 216535 (Application No. 1997-24564).

According to the Korean Patent No. 216535, the present location of the moving object is found in a dead reckoning (DR) technique by using data collected from a direction and distant sensor attached to the moving object and set to be a first moving location. Correction is performed on the link on the digital numeric map by a map mapping method using a location matching of the first moving location and the corrected position is set to be a second moving location. The present location of the moving object is estimated using the GPS location information received from GPS and set to be a third moving location. Correction is performed on the link on the digital numeric map by a map mapping method using a location matching and the third moving location is set to be a fourth moving location. Short distance moving patterns of the first to fourth moving locations are found, and similarities representing how much the short distance moving patterns of the first to fourth moving locations are matched with the link pattern are compared with each other. The moving location having the highest similarity is estimated as the final present location.

In such a location estimation method, the location of the moving object is estimated using a sensor signal and a GPS location data by the dead reckoning technique.

Without using the dead reckoning technique, direction sensors such as a gyro and an electronic compass may have errors depending on rotation direction. Traveling direction can be deflected or changed when the moving object stops. Therefore, the estimated traveling direction can include an error. Estimation of moving distance by wheel sensors includes errors due to external elements such as air pressure and street conditions. Accordingly, it is very difficult to solve instability of location estimation and to provide navigation service such as a map mapping in GPS shadow areas in the navigation system without any direction sensor.

It is not easy to estimate the locations of the moving object such as a mobile telephone having no direction sensors such as a gyro and an electronic compass, and the moving objects in the shadow areas, in which GPS data are not received, and the unreliable regions such as tunnel and underground passage in which quality of the received GPS location data is greatly lowered though the GPS location data is received. It is very difficult to estimate the location of the moving object precisely due to errors caused during estimation even if the location of the moving object can be estimated.

SUMMARY OF THE INVENTION

Accordingly, the present invention is directed to a method for estimating a location of a moving object in a navigation system that substantially obviates one or more problems due to limitations and disadvantages of the related art.

It is an object of the present invention to provide a method for estimating a location of a moving object in a navigation system, which is capable of accurately estimating the location of the moving object by using the speed of the moving object and a digital numeric map in shadow areas of GPS location data such as tunnel and underground passage.

It is another object of the present invention to provide a method for estimating location of a moving object in a navigation system, which is capable of accurately estimating the location of the moving object by using the speed of the moving object in cheap moving objects having no direction sensors such as a gyro and an electronic compass for a dead reckoning technique in CPS shadow areas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for estimating location of a moving object in a navigation system comprises the steps of: (a) receiving GPS location data from a moving object; (b) determining GPS shadow area by using the received GPS location data; (c) calculating moving straight distance of the moving object with reference to a last GPS location data in visible regions when the moving object is in a GPS shadow area; (d) calculating virtual location data by using the calculated moving straight distance of the moving object; and (e) calculating estimated location on a digital numeric map positioned nearest from the virtual location data, and performing a map-matching to provide a navigation service.

In another aspect of the present invention, a method for estimating location of a moving object in a navigation system comprises the steps of: (a) receiving GPS location data; (b) determining GPS shadow area by using the received GPS location data; (c) obtaining a map-matching value of a last GPS location data in visible regions when the moving object is in a GPS shadow area, and calculating moving straight distance of the moving object with reference to the map-matching value; (d) detecting interpolated points and link of location estimated to be calculated moving straight distance of the moving object; (e) ascertaining whether the moving object is on the detected link; and (f) estimating moving location by using distance of the link, coordinates of the interpolated point, speed of the moving object and length of the link if the moving object is on the detected link.

In the present invention, the location of the moving object in the shadow area is more accurately estimated using parameters such as speed of the moving object traveling to the shadow area, direction of the link at the last map-matching location on the digital numeric map and link and interpolated point on the digital numeric map.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings.

DETAILED DESCRIPTION OF INVENTION

Reference will now be made in detail to the preferred embodiments of the present invention, examples of which are illustrated in the accompanying drawings wherever possible, the same reference numbers will be used throughout the drawings to refer to the same or like parts.

Hereinafter, a navigation system according to the present invention will be described.

Figure 1:
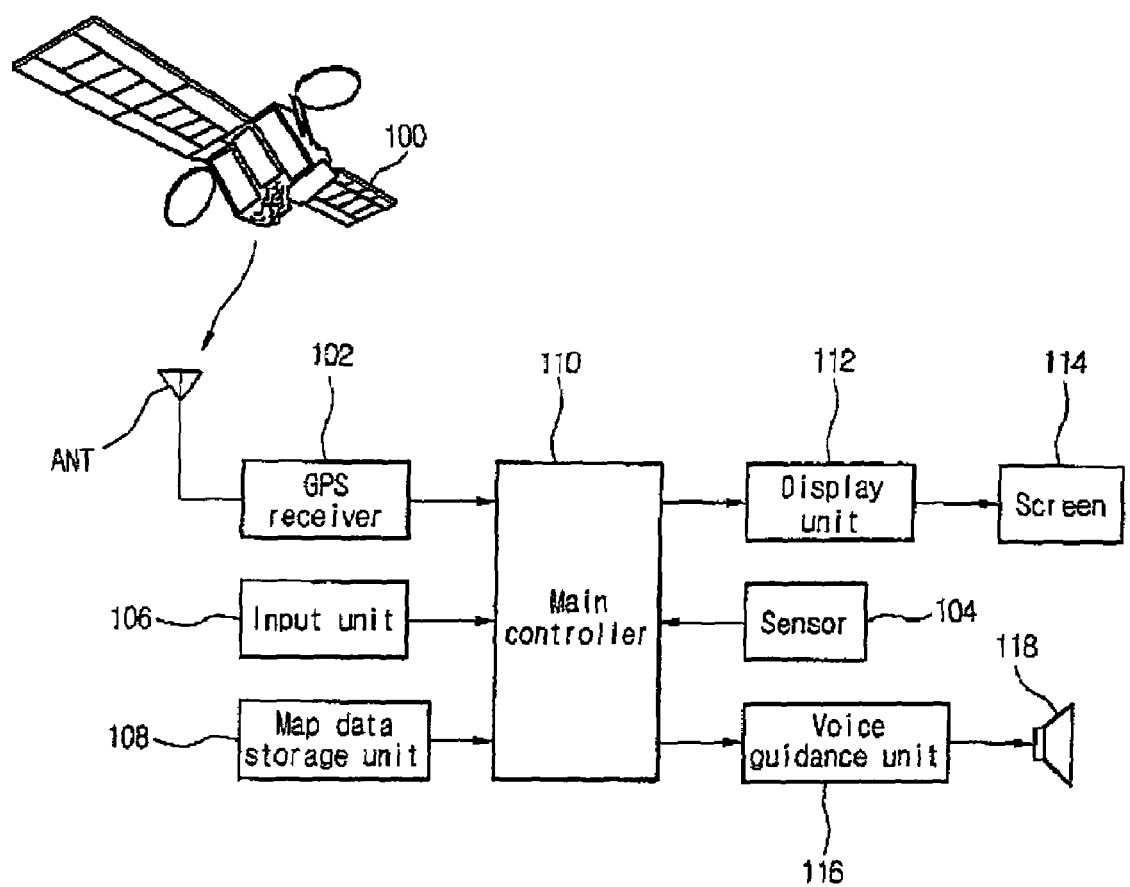
FIG. 1 illustrates a navigation system according to the present invention.

FIG. 1 illustrates a navigation system according to the present invention.

Referring to FIG. 1, the navigation system includes: a GPS receiver 102 for receiving a location data transmitted from three or more GPS satellites 100 through an antenna ANT; a sensor 104 for sensing a moving distance and a speed of a moving object; an input unit 106 for receiving a destination of the moving object by a user's manipulation; a map data storage unit 108 for storing map data in a storage media such as a compact disk; a main controller 110 for determining the present location of the moving object with a received signal of the GPS receiver 102, receiving a destination through the input unit 106, setting and storing a traveling path to the destination from the present location of the moving object with reference to the map data stored in the map data storage 108, setting a guide object positioned on the traveling path and controlling a traveling path guide operation on the location of the guide object; a display unit 112 for displaying the present location of the moving object along with map data on a screen 114 according to the control of the main controller 110; an a voice signal guidance unit 116 for guiding the traveling path of the moving object with a voice signal through a speaker 118 under the control of the main controller 110.

First, the GPS receiver 102 receives a predetermined location data transmitted from a plurality of GPS satellites 100 and delivers the data to the main controller 110 so as to use navigation service. The sensor 104 senses the speed and the moving distance of the moving object and delivers them to the main controller 110.

The main controller 110 determines the present location of the moving object with the received signal of the GPS receiver 102 and matches the determined present location of the moving object to map data stored in the map data storage 108. When the moving object goes from the present location into a shadow area, the sensor 104 calculates the moving straight distance on which the moving object can move so that the next location of the moving object is estimated.

In other words, when it is possible to provide the service which guides the traveling path of the moving object and informs of the present location according to the movement of the moving object by using the received signal of the GPS receiver 102, the service is provided by-estimating the movable distance. For this, when the moving object moves into the shadow area, the moving distance of the moving object is calculated and the next location of the moving object in the shadow area is estimated using speed and distance of the moving object and link angle with reference to the last location of the moving object in the visible region.

When a user of the moving object inputs destination through the input unit 106, the main controller 110 refers to the map data stored in the map data storage 108, searches traveling path from the present location of the moving object to the destination, and guides the traveling path of the moving object with displaying the searched traveling path on the screen 114 through a display unit, 112 and outputting guide voice by a speaker 118 through voice guidance 116 simultaneously.

A method for estimating location of a moving object in the navigation system according to the present invention will be described below.

<First Embodiment>

Figure 2:
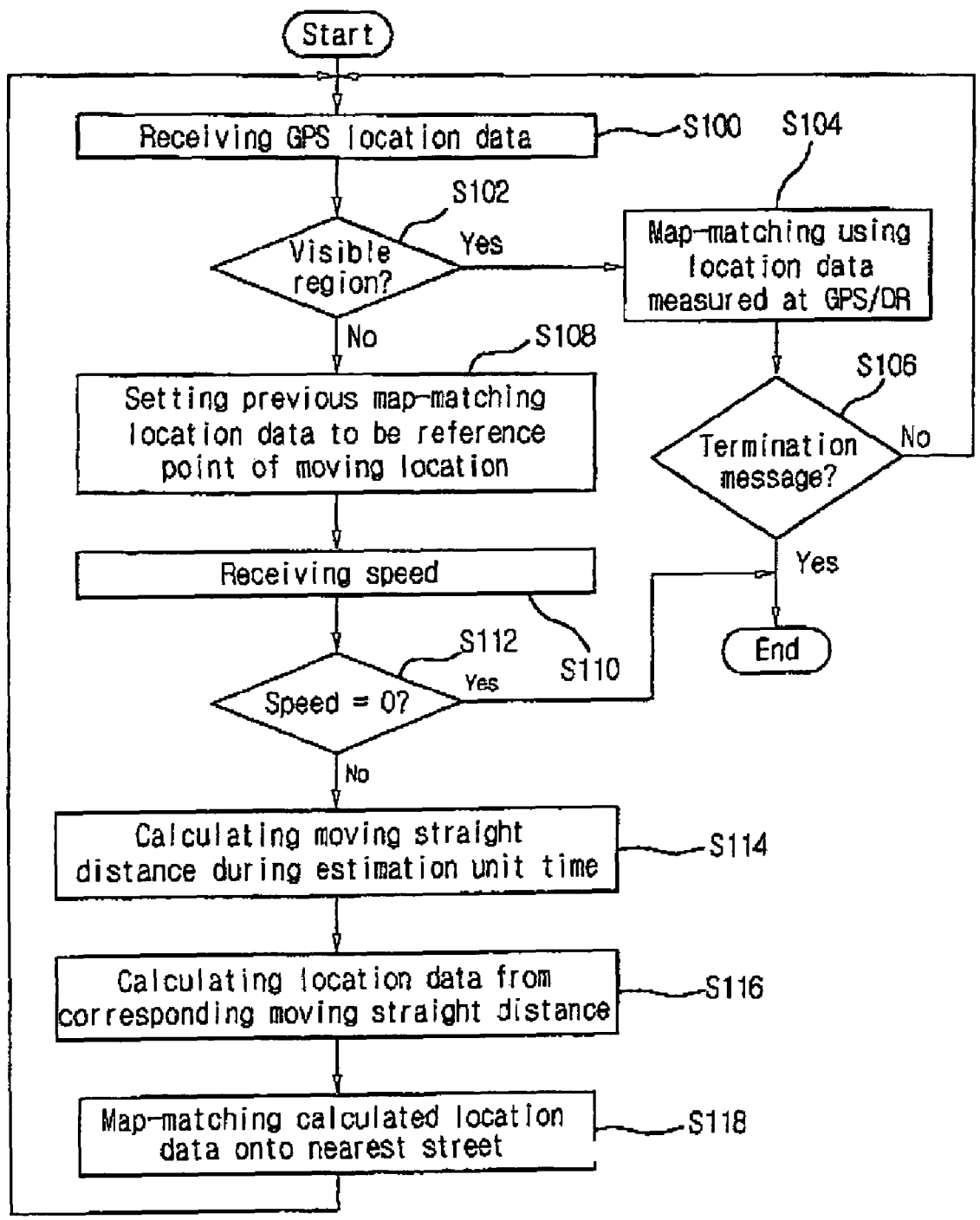
FIG. 2 is a flowchart illustrating a method for estimating a location of a moving object in a navigation system according to a first embodiment of the present invention.
Figure 3:
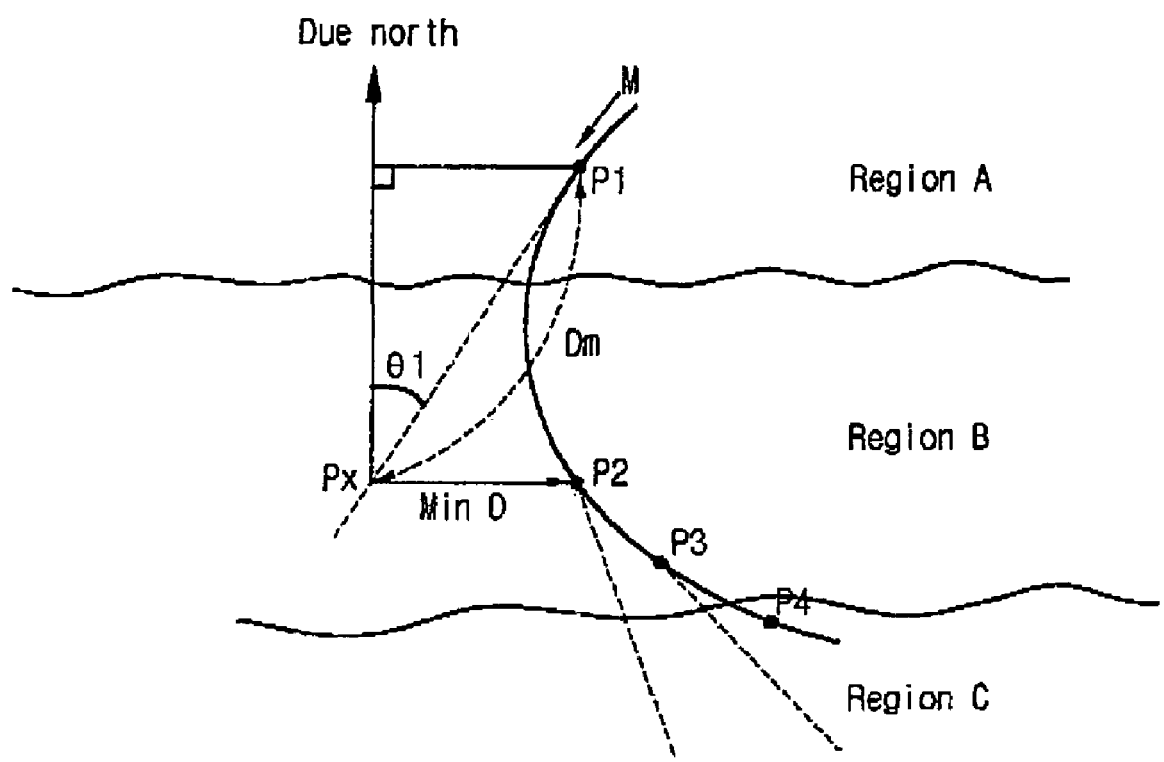
FIG. 3 exemplary illustrates a process of estimating a location of a moving object according to a method for estimating location of a moving object shown in FIG. 2.

FIGS. 2 and 3 illustrate a first embodiment of the present invention.

Most of all, referring to FIG. 2, the moving objects receive GPS location data from a plurality of GPS satellites through GPS receivers (S100) and determines whether the moving object is in the visible region or the shadow area by using the GPS location data received through the GPS receiver (S102).

Here, the criterion to determine whether the moving object is to determine whether the moving object is in the visible region or the shadow area of the GPS location data by using the identifying value on reliability of the received GPS location data. Here, the identifying value on the reliability of the GPS location data is calculated to be HDOP (Horizontal Dilution Of Precision) code by using a calculation algorithm provided from NMEA-6283 format. The calculated HDOP code is compared with a predetermined value. As the result of the comparison, if HDOP is less than the predetermined value, it is determined to be the visible region. If HDOP is greater than or equal to the predetermined value, it is determined to be the shadow area.

As a result of the determination at the step S102, if the moving object is in the visible region of the GPS location, a map mapping and a 'navigation' service are, performed using location data estimated by the GPS and the dead reckoning (S104). Then, it is terminated or goes to the step S100 according to the transmission of the termination message of the user and the GPS location data at the present location where the moving object moved to are received and navigation service is performed using the received GPS location data (S106).

However, if the moving object is in the shadow area of the GPS location data as the result of the determination at the step S102, the moving object of the previous last map-matching location data is set to be a reference of the moving location (S108). The present speed is inputted from the sensor (S110).

Here, it is determined whether the speed of the moving object is zero (S112). As the result of the determination, if the speed of the moving object is zero, it is recognized that the moving object stops and the process is terminated. If the speed of the moving object is not zero, it is recognized that the moving object is traveling in the shadow region and the moving straight distance is calculated during estimation unit time (S114). For example, if the estimated time is 1 second and the present speed of the moving object is 30 m/sec., the straight distance on which the corresponding moving object can move in a traveling direction is 30 meters per second. The moving direction of the moving straight distance is found in the due north reference angle of link positioned in the traveling direction at the last map-matching location in the visible region.

If a movable straight distance is calculated during the estimated time (S114), the corresponding location data (longitude, latitude) of location spaced from the last map-matching location (reference) of the visible region by the straight distance will be calculated using Equation 1 (S116). Here, the previous map-matching coordinates (longitude, latitude) are the longitude and the latitude of the last map-matching location before the moving object's entering the shadow area.

Longitude=longitude of previous map-matching coordinate+speed of moving object*
cos (attitude angle of previous map-matching location)*time (sec)

Latitude=latitude of previous map-matching coordinate+moving straight distance of moving object*sin (attitude angle of previous map-matching location) [Equation 1]

Where, moving straight distance of moving object=speed of moving object*time (sec), and the attitude angle of previous map-matching location is obtained from the due north reference angle of the previous map-matching link extension.

Similarly, if the location data (that is, virtual location) in the moving straight distance of the moving object estimated from the reference, the location data is map-matching onto the shortest distance on the digital map corresponding to the location data (S118). In other words, the actual location data of the moving object is moved to the location of the estimated moving straight distance, road on the digital numeric map and the shortest distance, and map-matching, so that the next location of the moving object can be estimated.

It is determined whether the moving object is in the shadow area of the GPS location data. If the moving object is in the shadow area, of the GPS location data, the moving straight distance is calculated from the speed of the moving object with reference to the location data obtained at the step S118. The virtual location data is obtained using the due north reference angle of the link and map-matching onto the location of the shortest distance on the digital numeric map so that a second location data are estimated and a third location data are sequentially estimated with reference to the second location data.

For example, as shown in FIG. 3, if the moving object M moves through a visible region A, a shadow area B such as a tunnel and a visible region C in the traveling direction of the moving object, the first location P1 which is map-matching last in the visible region A is referred when the moving object enters the shadow area B.

Here, supposing that the speed of the moving object sensed by the sensor 10 m/sec, the distance Dm between a first location P1 and an arbitrary moving location Px extending from the first location P1 straightly is 10 m. Here, estimation unit time has a period of 1 sec.

Here, the location data of a moving location Px separated from the first location by moving straight distance can be calculated using Equation 2.

Longitude=longitude of P1+10 m*cos (θ1 of P1)

Latitude=latitude of P1+10 m*sin (θ1 of P1) [Equation 2]

Where, θ1 is a due north reference angle of a link positioned on an extending line in a traveling direction of the moving object at the first location and an attitude angle of previous map-matching location.

It is noted that Equation 2 is the same as Equation 1.

Here, if the location data on the arbitrary estimated location is calculated, the second location P2 on the digital numeric map that is the shortest distance Min D from the location data is map-matching and the map-matching location P2 is estimated to be the location to which the moving object moved in an estimation unit time.

Referring to the map-matching second location P2, a third location is estimated using second location coordinates, moving straight distance in the estimation time and due north reference angle (attitude angle) of link of the second location. This operation is performed step by step according to HDOP code transmitted from the GPS satellite, until the moving object recognizes a good receivable region C of GPS satellite location data.

<Second Embodiment>

Figure 4:
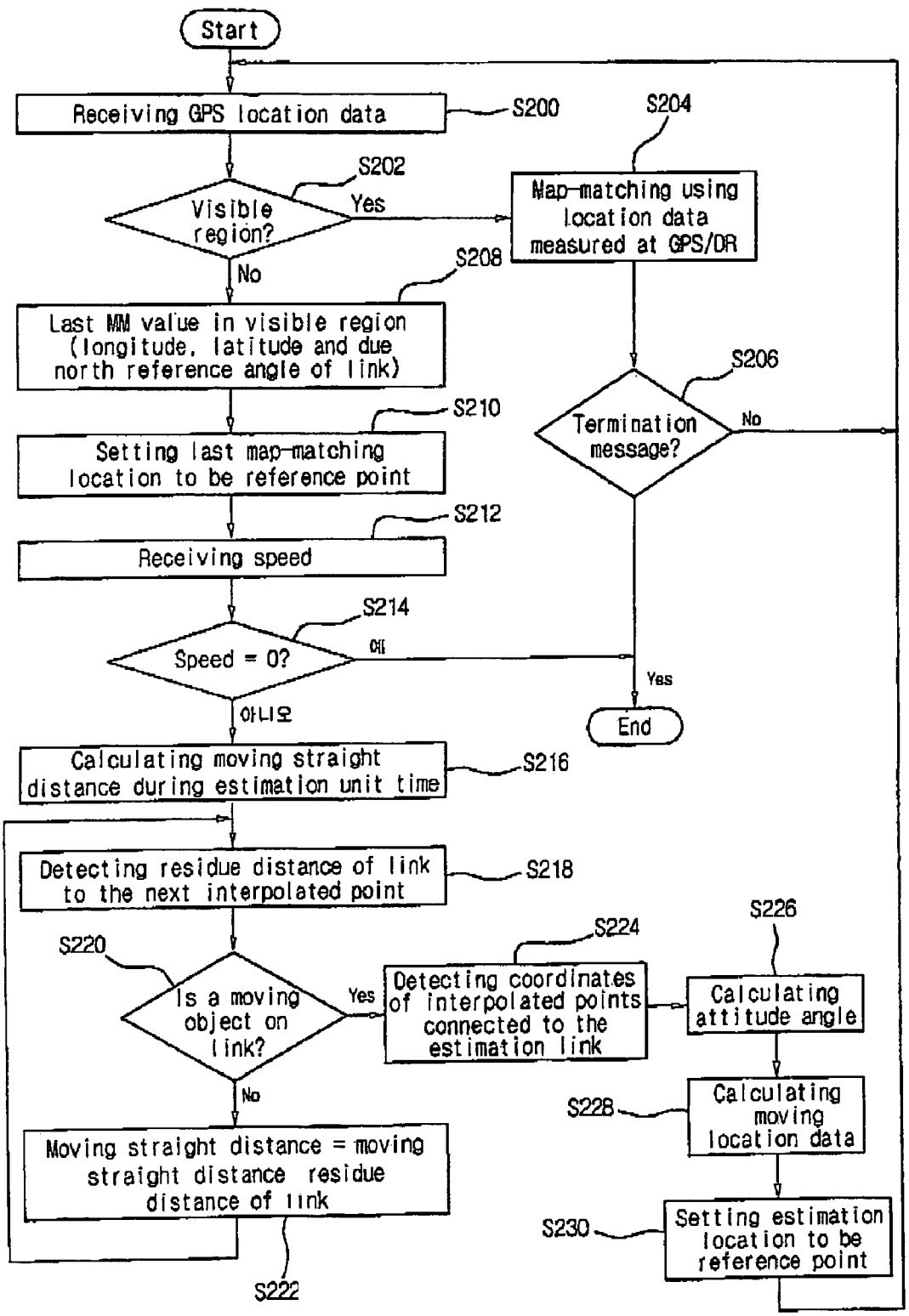
FIG. 4 is a flowchart illustrating a method for estimating a location of a moving object in a navigation system according to a second embodiment of the present invention.
Figure 5:
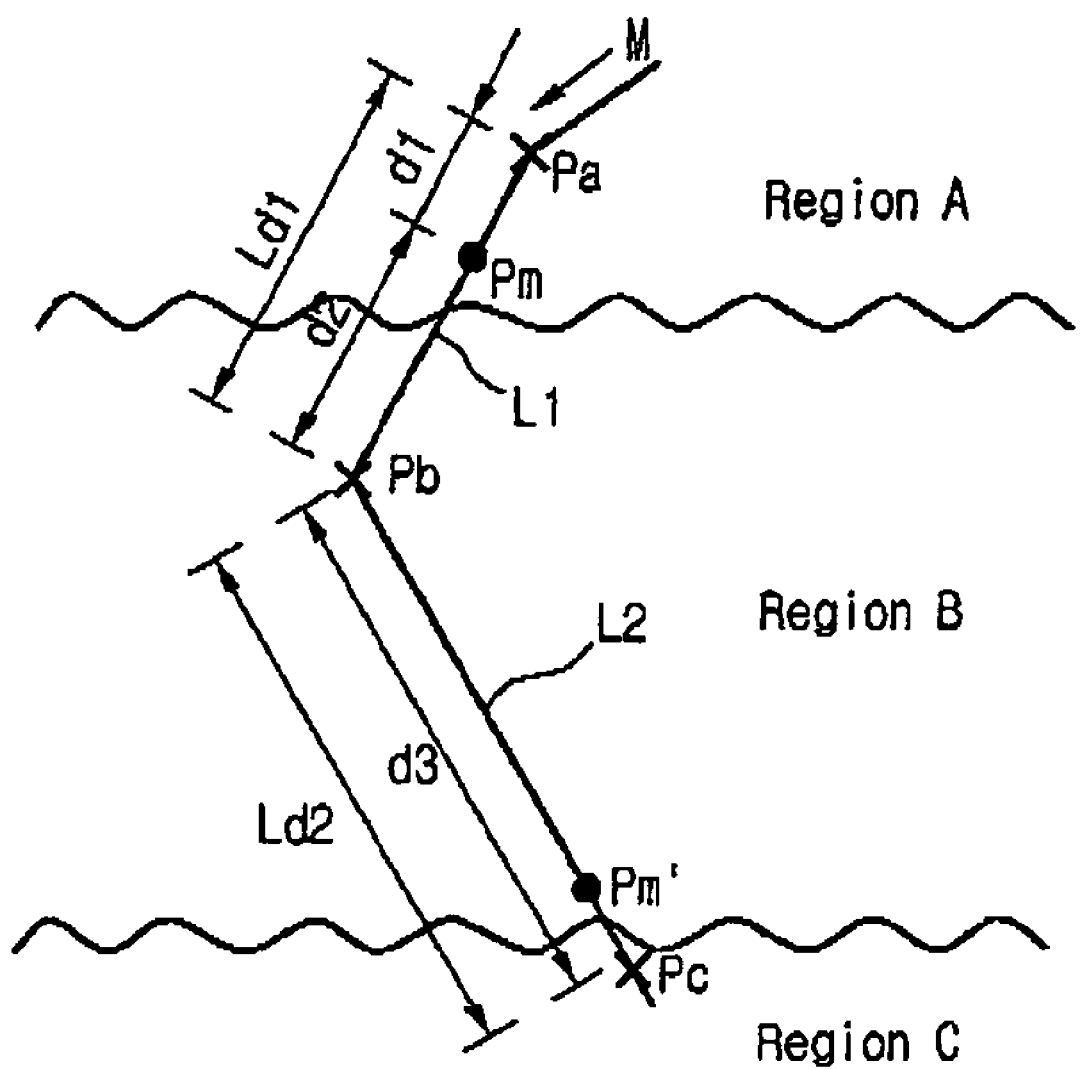
FIGS. 5 and 6 illustrate a second embodiment of the present invention.
Figure 6:
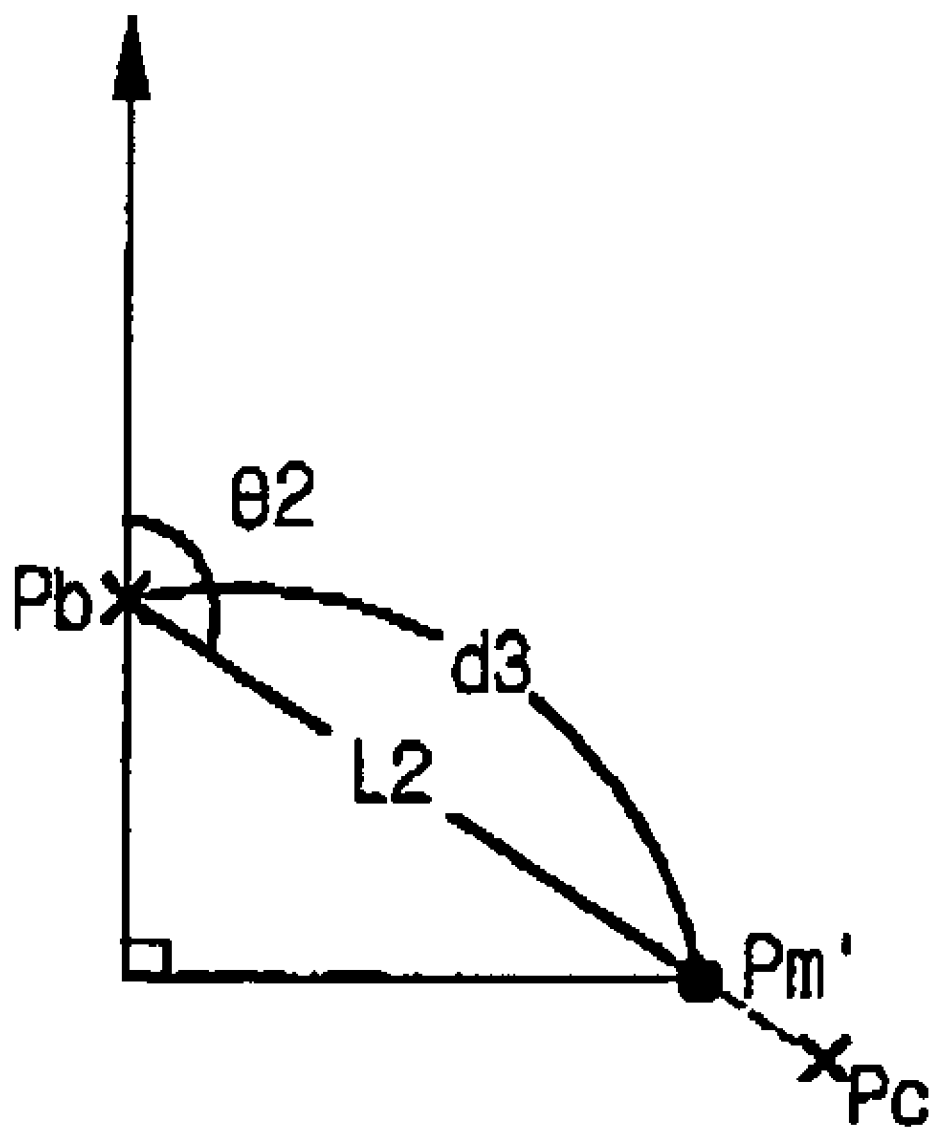

FIGS. 4 to 6 illustrate a second embodiment of the present invention.

Most of all, referring to FIG. 4, the moving object receives GPS location data from, a plurality of GPS satellites (S200) and determines whether the moving object is in the visible region or the shadow area by using the received GPS location data (S202).

Here, the method of the moving to determine whether the moving object is in the visible region or the shadow area by using the GPS location data is similar to the first embodiment. For example, HDOP (Horizontal Dilution Of Precision) code is calculated by using a calculation algorithm provided from NMEA-0283 format. If HDOP is less than the predetermined value, it is determined that the moving object is in the visible region. If HDOP is greater than or equal to the predetermined value, it is determined that the moving object is in the shadow area.

If the moving object is in the visible region of the CPS location, the location of the moving object is map-matching on the street of the digital numeric map by using location data estimated by GPS and DR and navigation service is provided (S204). If a user inputs termination message, the navigation services are terminated (S206).

On the other hand, if the moving object is in the shadow area of the CPS location data as the result of the determination at the step S202, the last map-matching values of GPS location data are obtained (S208). Here, the last map-matching values are coordinates (longitude, latitude) corresponding to GPS location data and due north reference angle of the corresponding mapped link with which the traveling direction of the moving object can be ascertained.

The last map-matching location of the CPS location data in the visible region is set to be the reference for estimating the location of the moving object in the shadow area (S210).

Then, the speed of the moving object is measured and it is determined whether the present speed of the moving object is zero (S214). As the result of the determination, if the speed of the moving object is zero, it is recognized that the moving object stops and the process is terminated. However, if the speed of the moving object is not zero, the moving straight distance during a predetermined estimation unit time is calculated (S216). The interpolated point and link in the calculated moving straight distance are detected and estimated and the residue distance of the link is detected (S218).

Specifically, referring to FIG. 5, if the moving object M moves through a visible region A, a shadow area B and a visible region C in the traveling direction of the moving object, the length (d1+d2−Ld1) of the link L1 bridging between arbitrary interpolated points Pa and Pb positioned in the traveling direction of the moving object (Pm→Pm') is calculated and the distance between the previous interpolated point Pa and the reference point Pm is subtracted (Ld1−d1=d2) from the length (d1+d2) of the link so that the residue distance (d2) of link is obtained. Here, the residue distance (d2) of the link is the distance from the reference point Pm to the interpolated point Pb, and the criterion to determine whether the moving object is on the link L1 or between the two interpolated points Pa and Pb. Here, two interpolated points are bridged by the link and the interpolated point is a point bridging two links. The length of the link is the distance between the interpolated points and the residue distance of the link is equal to the distance between the interpolated points or greater than or equal to zero.

Here, it is determined whether the moving object Pm' that is traveling in the region B is on the link L1 (S220). In other words, the residue distance d2 of the link is compared with the moving straight distance d2+d3 of the moving object. If the residue distance d2 of the link is greater than or equal to the moving straight distance d2+d3 of the moving object, it is recognized that the moving object M is on the corresponding link L1. If the residue distance d2 of the link is less than the moving straight distance d2+d3 of the moving object, it is recognized that the moving object M is out of the corresponding link L1 and is on another link, that is, L2 or other interpolated points Pb and Pc, so that it can be determined clearly whether the moving object is on the next link L2.

Here, if the moving object is not on the link, the value obtained by subtracting the residue distance d2 of the link from the moving straight distance (=d2+d3) is set to be the residue moving straight distance (=d3) of the moving object (S222). In other words, the moving straight distance (=moving straight distance−link. residue distance) is calculated and it proceeds to the step S218. The interpolated points Pb and Pc in the calculated residue moving straight distance d3 and another link L2 are estimated and the distance to the interpolated points Pb and Pc is detected (S218). Here, the distance to the next interpolated point corresponds to the distance (Ld2) of the link bridging the interpolated points Pb and Pc other than reference point.

Here, it is determined whether the moving object is on the next link L2 (S220). In other words, the residue moving straight distance (d3) of the moving object is compared with the distance (Ld2) of the new link. If the distance (Ld2) of the next link is greater than or equal to the residue moving straight distance (d3) of the moving object, it is estimated that the moving object is on the corresponding link. However, if the moving object is not oh the corresponding link, it is determined again whether the moving object is on another link in the residue moving straight distance of the moving object that is obtained by subtracting the distance of the corresponding link as described above.

If it is determined that the moving object is on the estimation link L2, the location data (coordinates) of the interpolated points Pb and Pc connected to the corresponding link Ld2 are detected and the coordinates of the detected interpolated points and attitude angle of the estimated link are calculated (S216).

Two interpolated points Pb and Pc connected to the link L2 on which the moving object is determined to be, for example, the previous interpolated point Pb connected to the front of the link in the traveling direction of the moving object and the next interpolated point Pc connected to the rear of the link in the traveling direction of the moving object are detected. The corresponding location data (longitude, latitude) are calculated by means of Equation 3 by using the corresponding location coordinates of the previous and next interpolated points, the attitude angle of the link and the speed of the moving object.

Longitude=longitude of previous interpolated point+ speed of moving object*sin (attitude angle of link)*time (sec)

Latitude=latitude of previous interpolated point+ speed of moving object*cos (attitude angle of link)*time (sec)     [Equation 3]

Where, the longitude and the latitude of the estimated data can be obtained from the longitude and the latitude of the next interpolated point backwards.

The moving location data of the moving object in the shadow area can be estimated using the coordinates of the interpolated points, the residue moving distance (d3) of the moving object, the distance (Ld2) of the link and attitude angle (Θ2) of the link (S228). The calculated estimated location data is set to be the reference to another estimation moving location (S230), so that the moving location of the moving object in the shadow area can be estimated using the speed during another estimation time, the moving straight distance, estimated interpolated point and link, and attitude angle of the estimation link.

More particularly, the present invention will be described below with reference to FIGS. 5 and 6.

Referring to FIGS. 5 and 6, if the moving object M moves from a visible region A to a shadow area B, the first interpolated point Pa is positioned in the visible region A and the second interpolated point Pb is positioned in the shadow area B. The third interpolated point Pc is positioned in the visible region C. This is the case that the moving object moves to the shadow area (Pm→Pm'). The first link (L1) bridging the first interpolated point Pa and the second interpolated point Pb, the second link (L2) bridging the second interpolated point Pb and the third interpolated point Pc, coordinates of the interpolated points Pa, Pb and P and the distances (Ld1 and Ld2) of the links L1 and L2 are structured to be database on the digital numeric map.

Therefore, when the moving object enters the shadow area B, the last map-matching location Pm of the visible region is obtained and referred to as a reference point. The moving straight distance that the moving object can move (Pm→Pm') can be determined based on the velocity of the moving object in a unit time. The link distance (d1) from the reference point Pm of the moving object to the first interpolated point Pa is subtracted from the distance (Ld1) of the first link L1 to obtain the residue distance (d2) of the first link. The residue distance (d2) of the fist link is compared with the moving straight distance (d2+d3) of the moving object, so that it can be determined whether the estimated location of the moving object is on the first link.

If the moving object is not on the first link, the residue distance (d2) of the first link is subtracted from the moving straight distance (d2+d3) of the moving object to obtain the residue moving straight distance (d3). The second link Ld2 connected to the second interpolated point Pb and the third interpolated point Pc that is the end of the second link Ld2 are obtained. The residue moving straight distance (d3) is compared with the distance (Ld2) of the second link L2. If the distance (Ld2) of the second link L2 is longer than or equal to the residue moving straight distance (d3), it is determined that the moving object Pm' is on the second link L2.

Then, the location data of the moving object are calculated using the residue distance (d3) of the moving object Pm', the distance (Ld2) of the estimated second link, coordinates of the second and third interpolated points Pb and Pc, and the due north reference angle of the second link as shown in FIG. 6. Here, the estimated location is set to be reference point.

In other words, supposing that the length of the first link, the length of the second link and the distance from the first interpolated point to the last map-matching location are 5 m, 8 m and 2 m and the speed of the moving object is 10 m/sec, the distance between the last map-matching location and the second interpolated point is d2=5 m−2 m=3 m. Here, since d2 (=3m) is less than the moving straight distance (10 m), it is determined whether the moving object is on another link with the residue moving straight distance (=d3) obtained by subtracting the residue distance (d2) of the first link L1.

Here, since the residue moving distance (d3=7 m) is less than the length (8 m) of the second link, it is determined that the moving object Pm" is on the second link. Accordingly, the coordinates of the corresponding interpolated points of the second interpolated point Pb and the third interpolated point Pc connected to the second link L2 are detected. The corresponding location data (longitude, latitude) of the moving object are calculated using the corresponding coordinates of the detected interpolated points, the attitude angle of the second link L2 and the speed of the moving object. The detailed calculation method will be described referring to FIG. 6.

As shown in FIG. 6, the residue distance (d3) that the moving object moves from the second interpolated point Pb is calculated using the speed of the moving object at the second interpolated point Pb. The attitude angle $\Theta 2$ between the direction to the due north and the second link L2 is calculated. The corresponding location data (longitude, latitude) are calculated by substituting the calculated distance (d3) and the attitude angle into [Equation 4] as follows.

Longitude=longitude of $Pb$+moving distance $(d3)$*
 cos($\theta 2$)

Latitude=latitude of $Pc$+moving distance $(d3)$*
 sin($\theta 2$)  [Equation 4]

where estimation can be performed referring to the third interpolated point Pc other than the location data of the second interpolated point Pb.

Similarly, in the present invention, when estimating the moving location of the moving object moving from the visible region to the shadow area, location of the moving object moving to the shadow area can be estimated step by step using the parameters such as last map-matching location data in the visible region, attitude of link, speed of moving object, interpolated points and distance of link.

As described above, according to the method of the present invention, the location of the moving object is estimated using the parameters such as moving distance according to speed, length of link, attitude angle, interpolated points with reference to the last map-matching location data in a shadow area, so that the reliability of the navigation system can be improved.

The location of the moving object can be estimated exactly using the speed of the moving object and the digital numeric map in the shadow area. The cheap moving object having no direction sensor such as a gyro or an electronic compass for the dead reckoning technique in the shadow area can exactly estimate the location of the moving object by using the speed of the moving object.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for estimating a location of a moving object in a navigation system, comprising:
   (a) receiving GPS (Global Positioning System) location data from a moving object;
   (b) determining if the moving object has entered a GPS shadow area by using the received GPS location data, said GPS shadow area corresponding to an area where received GPS location data is unreliable;
   (c) calculating a moving straight distance of the moving object with reference to a last GPS location data in a visible region when the moving object is in a GPS shadow area;
   (d) calculating a virtual location data by using the calculated moving straight distance of the moving object; and
   (e) calculating an estimated location on a digital numeric map positioned nearest from the virtual location data, and performing a map-matching to provide a navigation service,
   wherein the step (c) calculates the moving straight distance based on a non-GPS velocity of the moving object and an estimation unit time period, and
   wherein in the step (e), the virtual location data is calculated using a reference point of any one of the last GPS location data in the GPS visible region and the estimated location data of the moving object in the shadow area, the calculated moving straight distance, and a due north reference angle between due north and a link positioned along the moving straight distance.

2. The method according to claim 1, wherein the step (b) comprises:
   (b-1) calculating an identifying value on a reliability of the GPS location data by using GPS location data from a plurality of GPS satellite;
   (b-2) comparing the calculated identifying value with a set value; and (b-3) if the identifying value is greater than or equal to the set value, determining that the GPS location data is unreliable and thus the location of the moving object is in the shadow area, and if the identifying value is less than the set value, determining that the GPS location data is reliable and thus the location of the moving object is in the visible region.

3. The method according to claim 2, wherein in the step (b-1), the identifying value of the reliability of the GPS location data is a horizontal dilution of precision (HDOP) value.

4. The method according to claim 2, wherein in the sep (b-3), the location of the moving object is estimated using the GPS location data or a dead reckoning technique when the location of the moving object is determined to be in the visible region.

5. The method according to claim 1, wherein in the step (e), coordinates (longitude, latitude) of the virtual location data are obtained by:

longitude=longitude of a previous map-matching location+the velocity of the moving object*cos (an attitude angle of the previous map-matching location)*time (sec), and latitude=latitude of the previous map-matching location+the velocity of the moving object*sin (the attitude angle of previous map-matching location)*time (sec).

6. The method according to claim 1, wherein the due north reference angle of the link is a link due north reference angle positioned on an extended traveling direction with reference to the previous map-matching location data of GPS location data.

7. The method according to claim 1, further comprising:
(f) after the step (e), if the estimated location of the moving object is map-matched onto the digital numeric map, obtaining a next virtual location data of the moving object by using the calculated moving straight distance of the moving object and the due north reference angle of the corresponding link with reference to the map-matching location, and calculating a next estimated location by map-matching the next virtual location data onto a shortest distance of the digital numeric map.

8. A method for estimating a location of a moving object in a navigation system, comprising:
(a) receiving GPS (Global Positioning System) location data;
(b) determining if the moving object has entered a GPS shadow area by using the received GPS location data, said GPS shadow area corresponding to an area where received GPS location data is unreliable;
(c) obtaining a map-matching value of a last GPS location data in a visible region when the moving object is in a GPS shadow area, and calculating a moving straight distance of the moving object with reference to the map-matching value;
(d) detecting interpolated points and corresponding links linking the interpolated points using the calculated moving straight distance of the moving object;
(e) ascertaining which link the moving object is on; and
(f) estimating a moving location by using a length of the link the moving object is on, coordinates of the interpolated points, and a velocity of the moving objects wherein the step (c) calculates the moving straight distance based on a non-GPS velocity of the moving object and an estimation unit time period, and wherein a next location of the moving object in the shadow area is estimated using the calculated moving straight distance or residue moving straight distance of the moving object, coordinates of interpolated points connecting a corresponding link on the digital numeric map, a length of the corresponding link, and a due north reference angle of the corresponding link.

9. The method according to claim 8, wherein in the step (d), the links and the interpolated points are detected on a digital numeric map.

10. A method for estimating a location of a moving object in a navigation system, comprising:
(a) receiving GPS (Global Positioning System) location data;
(b) determining if the moving object has entered a GPS shadow area by using the received GPS location data, said GPS shadow area corresponding to an area where received GPS location data is unreliable;
(c) obtaining a map-matching value of a last GPS location data in a visible region when the moving object is in a GPS shadow area, and calculating a moving straight distance of the moving object with reference to the map-matching value;
(d) detecting interpolated points and corresponding links linking the interpolated points using the calculated moving straight distance of the moving object;
(e) ascertaining which link the moving object is on; and
(f) estimating a moving location by using a length of the link the moving object is on, coordinates of the interpolated points, and a velocity of the moving object, wherein the step (e) comprises:
(e-1) calculating a first residue distance of a first link by using a distance to a next interpolated point from the last map-matching value;
(e-2) comparing the first residue distance of the first link with the calculated moving straight distance, determining that the moving object is on the first link if the first residue distance of the first link is greater than or equal to the calculated moving straight distance, and determining that the moving object is on a second link if the calculated moving straight distance is greater than the first residue distance of the first link; and
(e-3) if the moving object is determined to be on the second link, subtracting a second residue distance of the second link from the calculated moving straight distance, comparing the second residue distance with a distance of a third link, and determining whether the moving object is on the third link.

11. The method according to claim 8, wherein the location of the moving object in the shadow area is obtained by:

longitude=longitude of a previous interpolated point+the velocity of the moving object *cos (an estimated direction of the link)*time (sec), and latitude=latitude of the previous interpolated point+the velocity of the moving object* sin (the estimated direction of the link)*time (sec), where, the estimated direction of the link is the due north reference angle of the link.

12. The method according to claim 8, wherein the location (longitude, latitude) of the moving object in the shadow area is calculated using the non-GPS velocity of the moving object and the estimation unit time period, an estimated direction of a corresponding link, and coordinates (longitude, latitude) of interpolated points on the corresponding link.

* * * * *